United States Patent
Cipollini

(10) Patent No.: US 7,431,818 B2
(45) Date of Patent: Oct. 7, 2008

(54) ELECTROCHEMICAL FUEL DEOXYGENATION SYSTEM

(75) Inventor: Ned Emidio Cipollini, Enfield, CT (US)

(73) Assignee: United Technologies Corporation, Hartford, CT (US)

(*) Notice: Subject to any disclaimer, the term of this patent is extended or adjusted under 35 U.S.C. 154(b) by 522 days.

(21) Appl. No.: 10/810,796

(22) Filed: Mar. 26, 2004

(65) Prior Publication Data

US 2005/0211568 A1  Sep. 29, 2005

(51) Int. Cl.
*C25F 7/00* (2006.01)

(52) U.S. Cl. .................. 205/695; 205/696; 205/763; 205/765; 204/252; 204/263

(58) Field of Classification Search ............ 205/695, 205/696, 763, 765; 204/252, 263
See application file for complete search history.

(56) References Cited

U.S. PATENT DOCUMENTS

| 1,376,180 | A |   | 4/1921  | Wickersham |
|---|---|---|---|---|
| 3,933,638 | A | * | 1/1976  | Isley ........................ 210/97 |
| 4,539,086 | A |   | 9/1985  | Fujita et al. |
| 4,776,536 | A |   | 10/1988 | Hudson et al. |
| 5,275,000 | A |   | 1/1994  | Coffinberry et al. |
| 5,423,178 | A |   | 6/1995  | Mains |
| 5,570,580 | A |   | 11/1996 | Mains |
| 5,951,839 | A | * | 9/1999  | Reznik ........................ 204/554 |
| 6,026,644 | A |   | 2/2000  | Ito et al. |
| 6,315,815 | B1 |  | 11/2001 | Spadaccini et al. |
| 6,576,357 | B1 |  | 6/2003  | Helmolt |
| 6,695,956 | B2 | * | 2/2004 | Sugano et al. ............ 204/265 |
| 2002/0050451 | A1 | * | 5/2002 | Ford et al. ................. 204/252 |
| 2003/0136661 | A1 |   | 7/2003 | Kong et al. |

FOREIGN PATENT DOCUMENTS

WO  WO 95/27810  10/1995
WO  WO 03/081702  10/2003

OTHER PUBLICATIONS

European Search Report, Jul. 20, 2005.

* cited by examiner

*Primary Examiner*—Arun S Phasge
(74) *Attorney, Agent, or Firm*—Carlson, Gaskey & Olds

(57) ABSTRACT

A fuel system for an energy conversion device includes a deoxygenator system with an electrochemical conversion system to remove oxygen from fuel through conversion of the oxygen to water. The electrochemical conversion system is located within a fuel flow. On the fuel side $½O_2+2H^++2e^- \Rightarrow H_2O$ while on the reverse side the opposite reaction occurs. From the electrochemical conversion system the water is then collected and/or expelled from the system.

20 Claims, 3 Drawing Sheets

ELECTROCHEMICAL FUEL DEOXYGENATION SYSTEM

BACKGROUND OF THE INVENTION

The present invention relates to the removal of dissolved oxygen from fuels, and more particularly to electrochemically converting the oxygen to water.

The presence of dissolved oxygen in hydrocarbon jet fuels may be objectionable because it supports oxidation reactions that yield undesirable by-products. Jet fuel is often utilized in aircraft as a coolant for various systems in the aircraft. Dissolution of air in jet fuel results in an approximately 70 ppm oxygen concentration. When aerated fuel is heated between 350° F. and 850° F. the oxygen initiates free radical reactions of the fuel resulting in deposits commonly referred to as "coke" or "coking." Coke may be detrimental to the fuel lines and may inhibit combustion. The formation of such deposits may impair the normal functioning of a fuel delivery system, either with respect to an intended heat exchange function or the efficient injection of fuel.

Typically, lowering the oxygen concentration to 2 ppm is sufficient to overcome the coking problem. Various conventional fuel deoxygenation techniques are currently utilized.

One conventional Fuel Stabilization Unit (FSU) utilized in the aircraft field removes oxygen from jet fuel by inducing an oxygen pressure gradient across a membrane permeable to oxygen. Although quite effective, the gradient is produced by vacuum on one side of the membrane. As the vacuum also introduces mechanical forces on the membrane, the membrane is supported on a porous stainless steel plate, which is relatively expensive and may be a diffusion barrier requiring a relative increase in the unit size. Mechanical pumps and vacuum housings are also required which further increases the size and weight of the system.

Accordingly, it is desirable to provide a method and system for the deoxygenation of hydrocarbon fuel which minimizes coking in an inexpensive, size and weight efficient system.

SUMMARY OF THE INVENTION

The fuel system for an energy conversion device according to the present invention includes a deoxygenator system with an electrochemical conversion system that removes oxygen from the fuel through conversion of oxygen to water. The electrochemical conversion system includes a first electrode, a second electrode, and an electrolyte therebetween such as is commonly referred to as a proton exchange membrane fuel cell.

The first electrode is located in contact with a fuel flow. On the fuel side, oxygen is converted to water by the electrochemical reaction: $\frac{1}{2}O_2+2H^++2e^-=>H_2O$. The water may remain in the fuel stream or be absorbed into the electrolyte. The second electrode is separated from the first electrode and the fuel stream by the electrolyte. On the second-electrode side, many reactions may occur. In the simplest case, only the opposite reaction, $H_2O=>\frac{1}{2}O_2+2H^++2e^-$, occurs and, thus, water is consumed and oxygen liberated. In this case, the device acts like an electrochemical oxygen pump removing oxygen from the fuel stream at the first electrode and depositing it at the second electrode separated from the fuel stream by the electrolyte. The water consumed at the second electrode must be supplied by the electrolyte or externally. The oxygen liberated at the second electrode must be vented.

The present invention eliminates conventional oxygen permeable membranes as the electrode directly contacts the fuel. The present invention also eliminates the need for a absolute pressure differences, oxygen permeable membranes, and components with moving parts such as pumps.

The present invention therefore provides a method and system for the deoxygenation of hydrocarbon fuel to minimize coking in an inexpensive, size and weight efficient system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
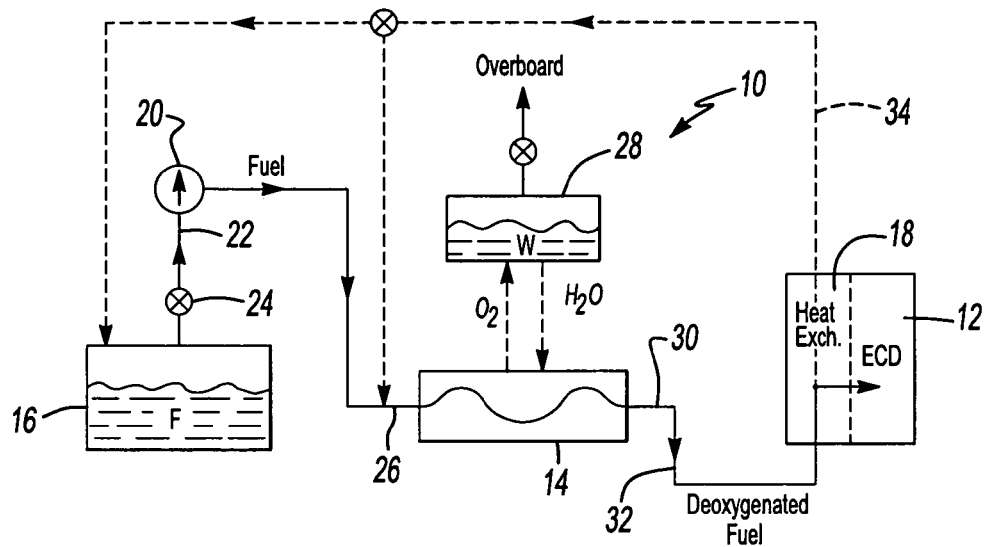
FIG. 1 is a general schematic block diagram of an energy conversion device (ECD) and an associated fuel system employing a fuel deoxygenator in accordance with the present invention.

FIG. 1 illustrates a general perspective view of a fuel system 10 for an energy conversion device (ECD) 12. A deoxygenator system 14 receives liquid fuel F from a reservoir 16. The fuel F is typically a hydrocarbon such as jet fuel. The ECD 12 may exist in a variety of forms in which the fuel, at some point prior to eventual use for processing, for combustion or for some form of energy release, acquires sufficient heat to support autoxidation reactions and coking if dissolved oxygen is present to any significant extent in the fuel.

One form of the ECD 12 is a gas turbine engine, and particularly such engines in high performance aircraft. Typically, the fuel also serves as a coolant for one or more subsystems in the aircraft, and in any event becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by pump 20 assists in circulating the fuel F through the deoxygenator system 14 and other portions of the fuel system 10. As the fuel F passes through the deoxygenator system 14, oxygen dissolved in the fuel is selectively converted to water W which either remains in the fuel F or is absorbed into the deoxygenator system. The deoxygenator system consumes water supplied by reservoir 28 and generates oxygen, which is collected and/or expelled from the system 10 at 28.

The deoxygenated fuel F flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel may be recirculated, as represented by recirculation conduit 34 to either the deoxygenation system 14 and/or the reservoir 16. It should be understood that although a particular component arrangement is disclosed in the illustrated embodiment, other arrangements will benefit from the instant invention.

Figure 2:
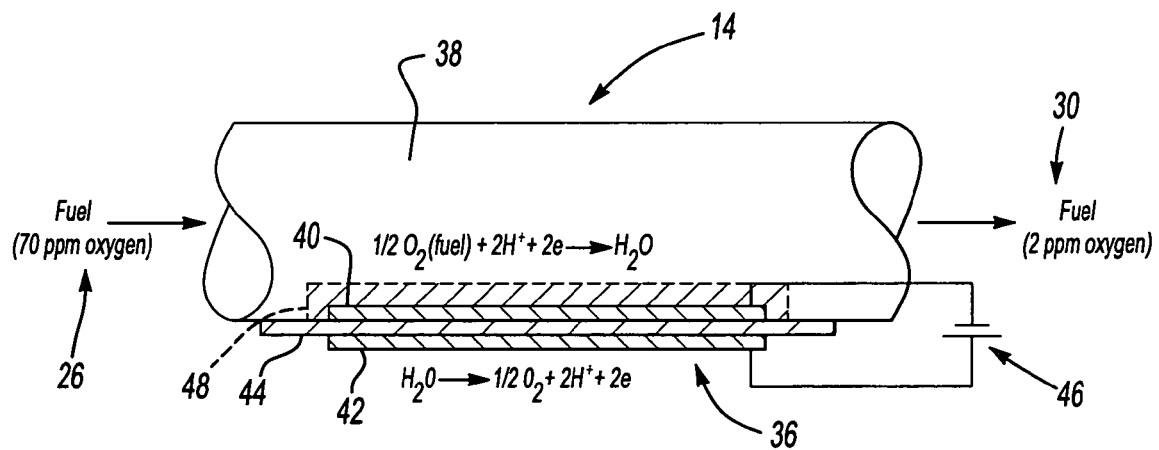
FIG. 2 is a block diagram of the deoxygenator system of the present invention.

Referring to FIG. 2, the deoxygenator system 14 preferably includes an electrochemical conversion system 36 that removes oxygen from the fuel through conversion of the oxygen to water. The electrochemical conversion system 36 is located along a fuel conduit 38 (illustrated schematically). The electrochemical conversion system 36 is preferably sized to remove oxygen at a rate commensurate with fuel flow to the ECD 12. The electrochemical conversion system 36 12 thereby removes oxygen during online operation of the ECD 12 at flow rates consistent with fuel usage. It should be understood that the electrochemical conversion system 36 may be located anywhere in the fuel system 10 prior to the ECD 12 and may take various shapes other than a straight conduit which may alternatively or additionally provide convective transfer of oxygen to the device surface and/or lower diffusional distances.

Figure 3A:
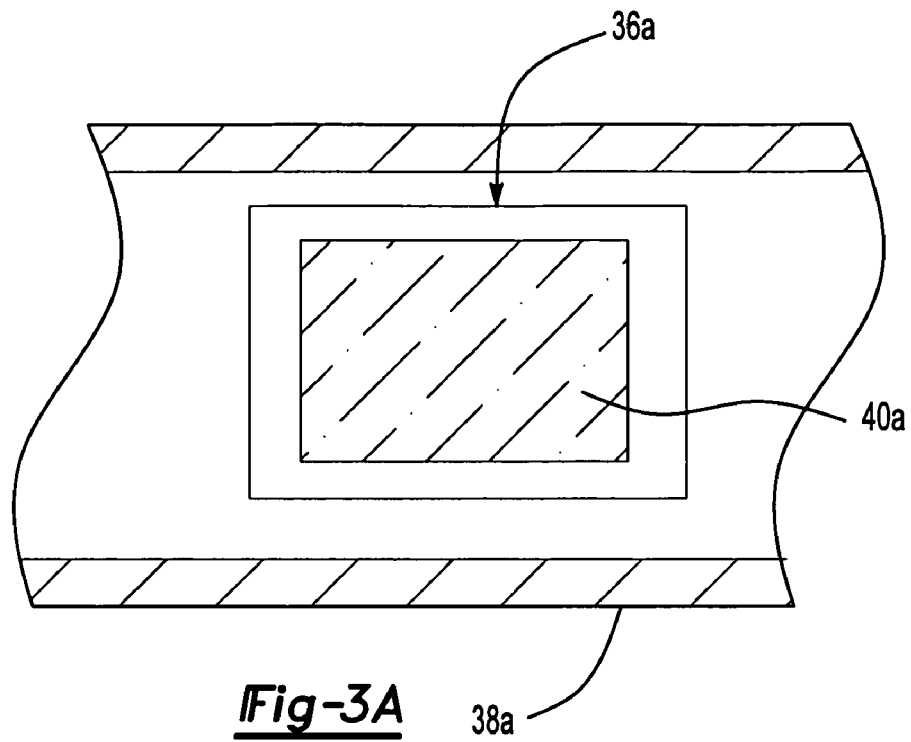
FIG. 3A is another view of a deoxygenator system in which the electrode-electrolyte assembly is located within a fuel flow path.

The electrochemical conversion system 36 includes a first electrode 40 a second electrode 42, and an electrolyte 44 therebetween such as is commonly referred to as an ionically conducting member or proton exchange-electrolyte. The first electrode 40 and second electrode 42 are normally made porous and electrically conducting while the electrolyte 44 is substantially non-porous and electrically insulating. The electrodes and electrolyte are usually laminated together forming a mechanical bond and allowing ions to transport among three components. The first electrode 40 and second electrode 42 must be electrically isolated from each other and preferably from the fuel conduit 38. This is preferably accomplished by laminating the first and second electrodes with an electrolyte member that is physically larger than either electrode into assembly 36. The electrolyte 44 preferably forms a portion of the fuel conduit 38 such that the first electrode is in communication with the fuel flow. Although the electrode-electrolyte assembly is illustrated as a relatively linear member in FIG. 2, it should be understood that this assembly 36a may alternatively or additionally be of any configuration and form any portion of the fuel conduit 38a such as a tubular section or the like (FIG. 3A).

The materials of the first and second electrodes 40, 42 are preferably Pt or Pt-alloys, e.g., Pt—Ir, pure or supported on carbon. The Pt—Ir is most preferred for the second electrode 42. The membrane electrolyte 44 is preferably ionically conducting and should not be construed as limited to a proton exchange membranes.

The electrochemical conversion system 36 is powered by a power source 46. The electrochemical conversion system 36 forms a concentration cell with an equilibrium Nernst potential of 22 mV at 25° C. for a concentration difference of 70 to 2 ppm. Approximately 22 mV+overpotential need only be supplied to affect the desired concentration reduction.

Figure 3B:
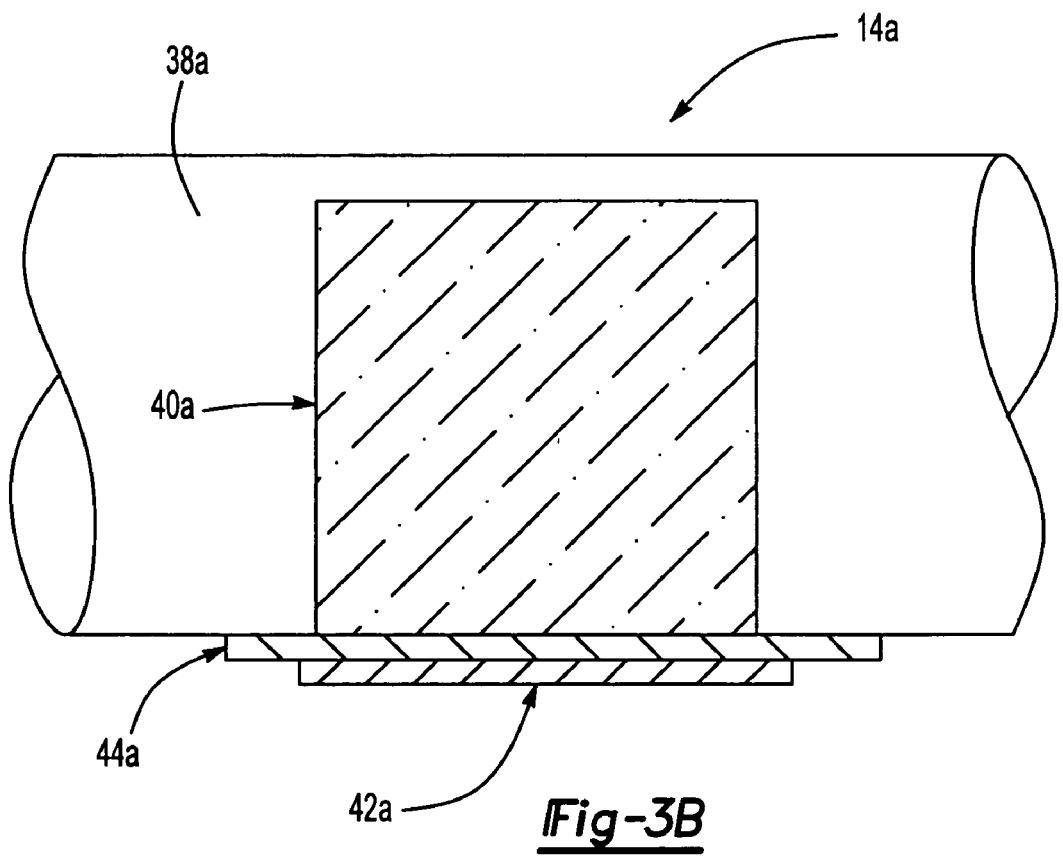
FIG. 3B is an expanded view of a deoxygenator system formed in part as a mixer section within a fuel flow path.

The first electrode 40 is located within the fuel conduit 38 in contact with a fuel flow F. Although the first electrode 40 is shown as a thin, uniform layer in FIG. 2, the first electrode 40 is preferably fabricated with a surface texture and/or of a configuration which assists in the mixing of laminar flow boundary layers to shorten diffusion lengths. To effect this mixing, for example only, the electrochemical conversion system 36 may alternatively or additionally be fabricated with the first electrode 40a as a mixer insert (illustrated schematically at FIG. 3B). More complex geometries for the electrochemical system 36 are possible and may further improve mixing.

Figure 4A:
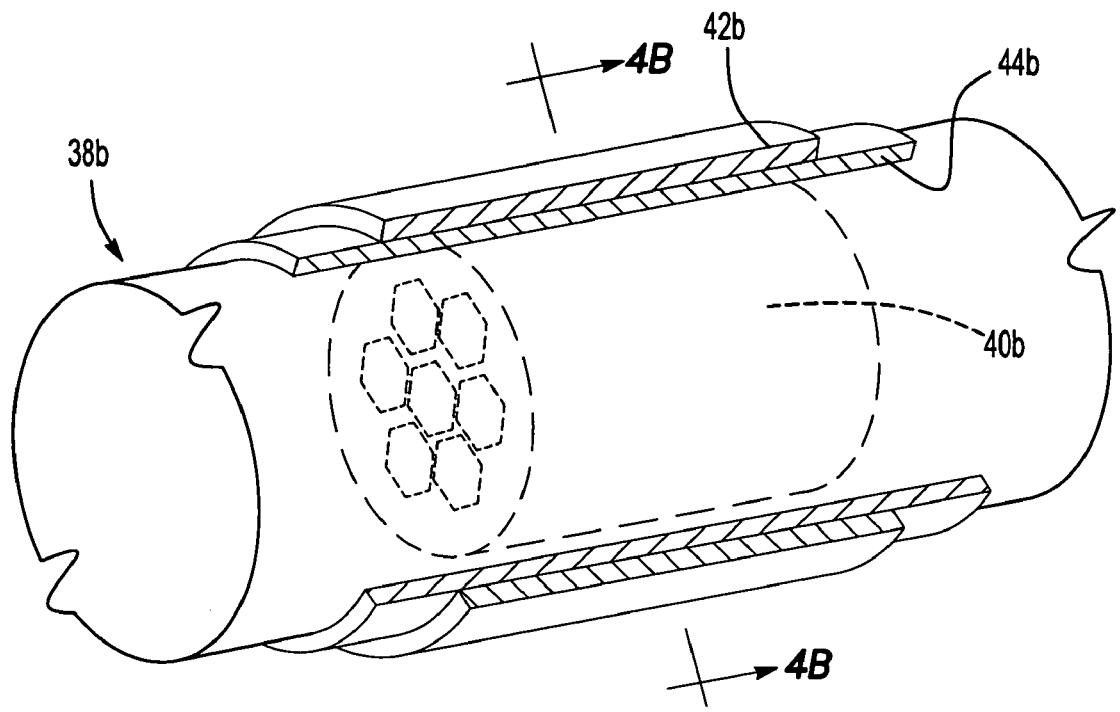
FIG. 4A is an expanded view of a deoxygenator system formed in part upon a honeycomb section.
Figure 4B:
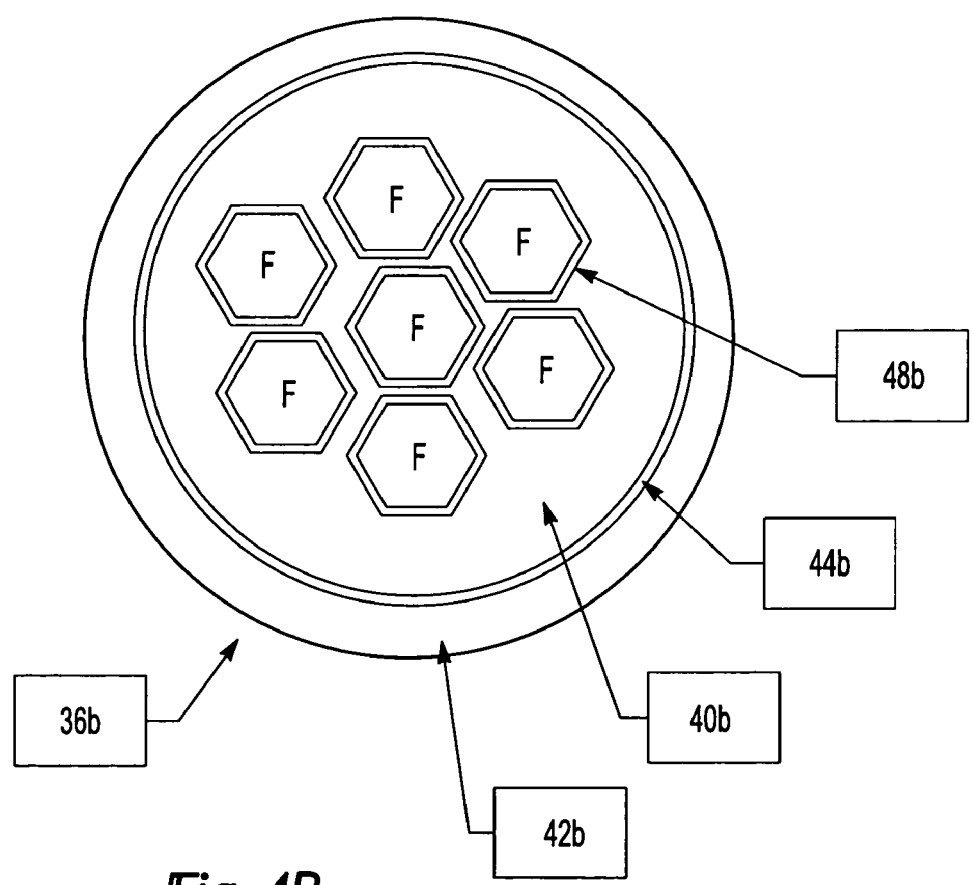
FIG. 4B is a sectional view taken along FIG. 4B-4B in FIG. 4A.

Referring to FIG. 4A, an electrochemical system 36b as a tubular shape which forms a section of the fuel conduit 38b, the first electrode 40b may be formed as a honeycomb structure (FIG. 4B), the electrolyte 44b is tubular in shape and forms a section of the fuel conduit 38b and the second electrode 42b is a coating on the outside of the electrolyte tube 44b which is shorter than the electrolyte tube and is electrically isolated from the fuel conduit 38b That is, the first electrode 40 is located in contact with the fuel while the second electrode 42b is physically isolated and located in a position to provide for the expulsion of the generated oxygen or other gaseous waste products. Alternatively, the first electrode 40 may be macro-porous and fill the space within the fuel conduit so as to improve oxygen diffusional characteristics to the fuel stream.

Fuel is generally inert and will not be harmed by the acidic environment adjacent the first electrode 40. However, as the first electrode 40 is in contact with the fuel flow F, the first electrode 40 may be coated with a barrier material 48 to limit fouling. The barrier 48 or 48b is preferably manufactured of a Teflon (AAF2400) or Hyflon (100) barrier material.

Alternatively or additionally, the overpotential for the water electrolysis reaction outside the fuel can be lowered by using an alloy catalyst such as Pt—Ir and/or adding a reducing agent to the fuel, such as ~100 ppm methanol, to lower the potential of the electrode outside of the fuel. Methanol added to the fuel stream will be absorbed into the electrolyte 44 and transmitted to the second electrode 42. In the presence of methanol, the reaction on the second electrode 42 will change from the water electrolysis reaction as described above, $H_2O => \frac{1}{2}O_2 + 2H^+ + 2e^-$, to the reaction, $CH_3OH + H_2O => CO_2 + 6H^+ + 6e^-$, which occurs at lower potential.

As the fuel flows past the electrochemical conversion system 36 oxygen is electrochemically removed from the fuel by converting the oxygen to water Removal of oxygen minimizes significant coking. As used herein, "significant coking" is the minimum amount of coking which, if it occurred in the interval between normal intended maintenance events for such portions of the fuel system, would be viewed as objectionable. Such coking occurs most readily in the portions of the fuel system having high temperatures and/or constricted flow paths The oxygen or carbon dioxide generated as the second electrode 42 must be vented to the atmosphere so a high gas pressure does not occur in the deoxygenator. Also, the electrochemical reactions at the second electrode 42 require water. The reservoir 28 provides both functions in the system shown in FIG. 1. This is a preferred embodiment, but not essential to this invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fuel system comprising:
an electrochemical conversion system in contact with a liquid hydrocarbon fuel containing a dissolved oxygen, said electrochemical conversion system operable to convert the dissolved oxygen to water and separate said water from said liquid hydrocarbon fuel.

2. The fuel system as recited in claim 1, wherein said electrochemical conversion system comprises a first electrode in contact with the liquid hydrocarbon fuel.

3. The fuel system as recited in claim 2, wherein said first electrode is coated with a barrier material.

4. The fuel system as recited in claim 2, wherein said first electrode comprises a surface texture which generates laminar flow boundary layer mixing.

5. The fuel system as recited in claim 2, wherein said first electrode is porous and formed into conduits through which fuel passes to increase the contact area between fuel and said first electrode.

6. The fuel system as recited in claim 1 further comprising a power source to power said electrochemical conversion system.

7. A fuel system comprising:
an electrochemical conversion system in contact with a liquid hydrocarbon fuel containing a dissolved oxygen, said electrochemical conversion system operable to convert the dissolved oxygen to water; and
a water collector in communication with said electrochemical conversion system to collect said water.

8. A method of removing dissolved oxygen from within a fuel system comprising the steps of:
(1) locating an electrochemical conversion system in contact with a liquid hydrocarbon fuel containing a dissolved oxygen;
(2) electrochemically converting the dissolved oxygen to water; and
(3) separating the water from the liquid hydrocarbon fuel.

9. A method as recited in claim 8, wherein said step (1) further comprises the steps of:
locating a first electrode within the liquid hydrocarbon fuel.

10. A method as recited in claim 9, further comprising the step of:
adding an oxidizable agent to the liquid hydrocarbon fuel in concentrations of about 0 to 100 ppm.

11. A method of claim 10 wherein said step (1) further comprises the step of:
oxidizing the oxidizable agent on the second electrode.

12. A method as recited in claim 9, further comprising the step of:
adding formaldehyde.

13. A method as recited in claim 9, further comprising the step of:
adding an alcohol.

14. A method as recited in claim 9, further comprising the step of:
adding ethylene glycol.

15. A method as recited in claim 8, further comprising the step of:
powering the electrochemical conversion system to provide at least a 22 mV+overpotential.

16. A method as recited in claim 15, wherein said step (2) further comprises the steps of:
reducing the dissolved oxygen concentration within the fuel to below 2 ppm.

17. A method as recited in claim 8, wherein said step (1) further comprises the steps of:
locating a first electrode within a communication path of the liquid hydrocarbon fuel.

18. A method as recited in claim 8, wherein said step (1) further comprises the steps of:
locating a first electrode within a communication path of the liquid hydrocarbon fuel; and
generating laminar flow boundary layer mixing with a surface geometry of the first electrode.

19. A method as recited in claim 8, wherein said step (1) further comprises the step of:
forming a concentration cell with the electrochemical conversion system.

20. A method of claim 19 further comprising the step of:
venting gas generated at the second electrode.

* * * * *